US012174208B2

(12) United States Patent
Thomas et al.

(10) Patent No.: US 12,174,208 B2
(45) Date of Patent: Dec. 24, 2024

(54) AUTOMATED SYSTEM FOR COLLECTING TISSUE SAMPLES, AND CORRESPONDING METHOD AND COMPUTER-READABLE MEDIUM

(71) Applicant: IDENTIGEN LIMITED, Dublin (IE)

(72) Inventors: David Robert Thomas, Dublin (IE); Ciaran Meghen, Dublin (IE); Gregory Alan Peters, Lawrence, KS (US); Amy Johanna Douglas, Stirling (GB); Robert Galbraith, Stirling (GB); Ryan Michael Watson, Stirling (GB)

(73) Assignee: IDENTIGEN LIMITED, Dublin (IE)

( * ) Notice: Subject to any disclaimer, the term of this patent is extended or adjusted under 35 U.S.C. 154(b) by 753 days.

(21) Appl. No.: 17/374,265

(22) Filed: Jul. 13, 2021

(65) Prior Publication Data

US 2023/0013750 A1 Jan. 19, 2023

(51) Int. Cl.
*G01N 35/00* (2006.01)
*B25J 9/16* (2006.01)
*G01N 1/08* (2006.01)

(52) U.S. Cl.
CPC ........ *G01N 35/0099* (2013.01); *B25J 9/1697* (2013.01); *G01N 1/08* (2013.01); *G01N 35/00029* (2013.01); *G01N 35/00732* (2013.01); *G01N 2035/00039* (2013.01); *G01N 2035/00089* (2013.01); *G01N 2035/00801* (2013.01)

(58) Field of Classification Search
None
See application file for complete search history.

(56) References Cited

U.S. PATENT DOCUMENTS

| | | | |
|---|---|---|---|
| 5,250,004 A | | 10/1993 | Sjoberg |
| 5,396,898 A | * | 3/1995 | Bittmann ............... G01N 1/286 600/562 |
| 5,660,995 A | | 8/1997 | O'Connor |
| 5,741,177 A | * | 4/1998 | Roberts ................ A22B 5/0064 83/919 |
| 5,928,986 A | | 7/1999 | Parmentier et al. |
| 6,095,915 A | | 8/2000 | Geissler et al. |
| 6,322,508 B1 | | 11/2001 | Goldenberg et al. |
| 7,229,764 B2 | | 6/2007 | Plastow et al. |

(Continued)

FOREIGN PATENT DOCUMENTS

| | | |
|---|---|---|
| BR | PI0501234 A | 8/2006 |
| CA | 2611533 A1 | 5/2009 |

(Continued)

OTHER PUBLICATIONS

"Research Project Opens Door to New Commercial Opportunities", QMS (Quality Meat Scotland), Research Article, Mar. 10, 2014.

(Continued)

*Primary Examiner* — Daniel S Larkin
(74) *Attorney, Agent, or Firm* — S.J. Intellectual Property LTD.

(57) ABSTRACT

A system for collecting tissue samples, such as meat tissues on carcasses, for example in the food industry. Also provided are methods for collecting tissue samples, and to a non-transitory computer-readable medium comprising program instructions to execute at least one step of the method for collecting tissue samples.

13 Claims, 3 Drawing Sheets

(56) References Cited

U.S. PATENT DOCUMENTS

| | | | |
|---|---|---|---|
| 7,772,983 B2* | 8/2010 | Grose | A22B 7/007 |
| | | | 340/573.3 |
| 9,545,113 B2 | 1/2017 | Spierts et al. | |
| 2001/0010918 A1 | 8/2001 | O'Connor | |
| 2002/0012934 A1 | 1/2002 | Meghen et al. | |
| 2003/0030397 A1 | 2/2003 | Simmons | |
| 2003/0172560 A1 | 9/2003 | Sanjurjo et al. | |
| 2005/0026181 A1 | 2/2005 | Davis et al. | |
| 2005/0069890 A1 | 3/2005 | Mabilat et al. | |
| 2005/0272057 A1 | 12/2005 | Abrahamsen et al. | |
| 2006/0014298 A1 | 1/2006 | Shirley et al. | |
| 2008/0064058 A1 | 3/2008 | Kapel et al. | |
| 2008/0085522 A1 | 4/2008 | Meghen et al. | |
| 2009/0148835 A1 | 6/2009 | Cave et al. | |
| 2010/0049661 A1 | 2/2010 | Lima | |
| 2010/0294046 A1 | 11/2010 | Boeke et al. | |
| 2011/0092379 A1 | 4/2011 | Cahana et al. | |
| 2013/0306267 A1 | 11/2013 | Feldman et al. | |
| 2014/0097940 A1 | 4/2014 | Kwak | |
| 2014/0212558 A1 | 7/2014 | Spierts et al. | |
| 2018/0045701 A1 | 2/2018 | Lund et al. | |
| 2020/0184419 A1 | 6/2020 | Watling et al. | |
| 2020/0251181 A1 | 8/2020 | Amini et al. | |
| 2020/0339704 A1 | 10/2020 | Bradner et al. | |
| 2021/0183470 A1 | 6/2021 | Amini et al. | |
| 2021/0193264 A1 | 6/2021 | Amini et al. | |
| 2021/0193265 A1 | 6/2021 | Amini et al. | |
| 2021/0193266 A1 | 6/2021 | Amini et al. | |
| 2021/0233614 A1 | 7/2021 | Amini et al. | |

FOREIGN PATENT DOCUMENTS

| | | | |
|---|---|---|---|
| CN | 1773450 | A | 5/2006 |
| CN | 101875975 | A | 11/2010 |
| CN | 101875976 | A | 11/2010 |
| CN | 101956606 | A | 1/2011 |
| CN | 102142116 | A | 8/2011 |
| CN | 102485892 | A | 6/2012 |
| CN | 102682322 | A | 9/2012 |
| CN | 102885012 | A | 1/2013 |
| CN | 205733748 | U | 11/2016 |
| CN | 107201409 | A | 9/2017 |
| CN | 108118096 | A | 6/2018 |
| CN | 109355402 | A | 2/2019 |
| CN | 109556979 | A | 4/2019 |
| CN | 109697685 | A | 4/2019 |
| CN | 110106261 | A | 8/2019 |
| CN | 110106262 | A | 8/2019 |
| CN | 111091887 | A | 5/2020 |
| CN | 111142548 | A | 5/2020 |
| DE | 19629166 | A1 | 2/1997 |
| DE | 19635032 | C1 | 3/1998 |
| DE | 10231041 | A1 | 12/2010 |
| DE | 102009023808 | A1 | 12/2010 |
| EP | 629295 | A1 | 12/1994 |
| EP | 0744128 | A1 | 11/1996 |
| EP | 0629295 | B1 | 6/1997 |
| EP | 865734 | A1 | 9/1998 |
| EP | 909388 | A2 | 4/1999 |
| EP | 913465 | A1 | 5/1999 |
| EP | 1449649 | A2 | 8/2003 |
| EP | 0909388 | B1 | 9/2003 |
| EP | 1600305 | A2 | 11/2005 |
| EP | 1802968 | A1 | 7/2007 |
| EP | 2031366 | A2 | 3/2009 |
| EP | 2720553 | A1 | 4/2014 |
| EP | 2933069 | A1 | 10/2015 |
| EP | 2720553 | B1 | 1/2018 |
| EP | 3265798 | A1 | 1/2018 |
| EP | 3697436 | A1 | 8/2020 |
| EP | 3731959 | A1 | 11/2020 |
| ES | 2297951 | A1 | 5/2008 |
| FR | 2779153 | A1 | 12/1999 |
| GB | 2000385 | A | 1/1979 |
| GB | 2569831 | A | 7/2019 |
| IN | 200802272 | | 9/2008 |
| JP | 2004292151 | A | 10/2004 |
| JP | 2011067178 | A | 4/2011 |
| KR | 20050046330 | | 5/2005 |
| KR | 780449 | B1 | 11/2007 |
| KR | 20130138899 | | 12/2013 |
| KR | 20160101884 | A | 8/2016 |
| KR | 20190091708 | | 8/2019 |
| WO | 9318408 | A1 | 9/1993 |
| WO | 9835236 | A2 | 8/1998 |
| WO | 2006034716 | A1 | 4/2006 |
| WO | 2008033042 | A2 | 3/2008 |
| WO | 2012173482 | A1 | 12/2012 |
| WO | 2014118539 | A1 | 8/2014 |
| WO | 2016139291 | A1 | 9/2016 |
| WO | 2018149180 | A1 | 8/2018 |
| WO | 2019079569 | A1 | 4/2019 |
| WO | 2019133756 | A1 | 7/2019 |
| WO | 2020243823 | A2 | 12/2020 |
| WO | 2021140191 | A1 | 7/2021 |

OTHER PUBLICATIONS

International Search Report and Written Opinion dated Oct. 21, 2022 for corresponding International Application No. PCT/EP2022/069580, filed Jul. 13, 2022.

* cited by examiner

AUTOMATED SYSTEM FOR COLLECTING TISSUE SAMPLES, AND CORRESPONDING METHOD AND COMPUTER-READABLE MEDIUM

FIELD OF THE INVENTION

The field of the invention is that of the sampling of tissue samples from animals.

More specifically, embodiments of the invention relate to a system for collecting tissue samples, such as meat tissues on carcasses, for example in the food industry. Embodiments of the invention also relate to methods for collecting tissue samples, and to a non-transitory computer-readable medium comprising program instructions to execute at least one step of said methods for collecting tissue samples.

BACKGROUND

Tissue sampling devices are used in the meat industry to take a sample of tissue from a carcass, which sample can then be used to extract carcass-specific DNA which may be used to determine carcass-specific information, for example the source of the meat (i.e. country, herd, farm, abattoir), or to determine the source of a microbial pathogen.

Tissue samples can be taken manually at an abattoir. However, this manual process is an intensive process, exhaustive for the operator. This process is also not always consistent and is prone to error.

It thus has been proposed to automate the collection of tissue samples.

However, such automated systems still need to be improved. For example, to further enhance the number of collected samples per time unit, while still avoiding the contamination of the different samples.

SUMMARY

At least one embodiment of the invention proposes a novel solution that does not have all the drawbacks of the prior art, in the form of a system that can automatically collect tissue samples, including a succession of animal tissue samples.

According to at least one embodiment, said system comprises:
- a robotic system, comprising:
  - a robotic arm,
  - at least one camera, configured to detect a sampling location on an animal,
- at least one sample handling assembly, comprising:
  - at least one magazine mounting assembly, configured to support at least one supply magazine and at least one return magazine, where this supply magazine is configured to receive at least one multi-well tray comprising a plurality of sampling devices detachably mounted in the wells of this tray, and where this return magazine is configured to receive this tray, comprising said plurality of sampling devices with collected samples,
  - at least one supply line, configured to convey this tray from the supply magazine to at least one sampling station, and from this sampling station to the return magazine,
  - this sampling station, located at a position accessible by the robotic arm,
- at least one reader configured to obtain an identifier of this tray,
- at least one processor, operably coupled to the robotic system, to the sample handling assembly, and to the reader, configured to:
  - drive this sample handling assembly to convey the tray from the supply magazine to the sampling station,
  - drive the robotic arm to grab a sampling device from a well of this tray,
  - drive this robotic arm to scrape a scraping portion of the sampling device against the animal,
  - obtain and store an identifier associated with the animal, the identifier of the tray, and the location of the well within the tray,
  - drive the robotic arm to replace this sampling device with the collected sample within the same well of the tray, and
  - drive the sample handling assembly to convey the tray from the sampling station to the return magazine.

This system for collecting tissue samples is a novel configuration of an automated sampling system, which may be fully automated. It allows reliable identification/indexing of the animals and of the collected samples, with no risk of contamination of the samples. This collection system represents a solution to manual swabbing for DNA analysis. Said collection system may be incorporated in a general factory system, such factory system being part, for example, of the slaughterhouse where are implemented sampling operations, and comprising a line carrying the carcasses to be sampled (for example suspended on carrying hooks).

The identifier associated with the animal (for example the identifier of the animal, or of a hook on which the animal is suspended) can be obtained by the reader which reads the identifier of the tray, or can be obtained by a second reader, which belongs to the factory system.

In particular, one embodiment of the invention proposes a system that can automatically collect tissue samples, including lean tissue samples, from animals on high throughput lines. For example, such collection system aims at processing between 1 and 600 animals per hour, for example more than 400 animals per hour, and also for example 420 animals per hour.

In one embodiment, the robotic arm of the system comprises a pressure sensor, configured to measure the force applied to the animal by this robotic arm during sampling. Thus, the robotic arm may be used to scrape the sampling device against the animal, with enough force and ensuring sufficient contact between said arm and the animal. This represents an automated and reliable way to detect when and if a sample has been correctly collected by the robotic arm.

In one embodiment, the system is configured to receive information from at least one presence sensor.

According to a specific embodiment, said presence sensor may be for example part of the general factory system, already present in the slaughterhouse or other plant where the sampling operations are implemented.

However, according to another specific embodiment, said presence sensor may be part of the collection system.

For example, such information comprises "presence" information, allowing the collection system to detect that an animal is in a detection range. Such information can also comprise "orientation" information, allowing the collection system to check if the animal is correctly orientated for the sampling.

Such information can be sent by a wire or wireless from the presence sensor to the collection system.

The collection system in accordance with at least one embodiment may be powered on only when "presence"

information is received, i.e. when the presence of an animal is detected, allowing low energy consumption.

The presence sensor can be for example a laser range finder, a limit switch, a camera, a motion sensor, a trigger, etc, configured to check that an animal/carcass is present and/or is coming—i.e. enters into the detection range, and/or is correctly orientated. The presence sensor is also configured to send this information to the system for collecting tissue samples.

In one embodiment, the system comprises at least one detector, or more generally detection means, configured to detect when all the sampling devices within the tray have been used to collect a tissue sample.

For example, the detector activates the processor to convey this tray from the sampling station to the return magazine.

The detector corresponds to an automated way to detect that a tray is full of collected samples. There is thus no need for a manual intervention of an operator, and also no need for a manual check. The detector is advantageously easy to implement on the collection system. According to one embodiment, the detector may be a counter, allowing counting of the number of samples taken.

For example, the detector is implemented by said at least one processor. Indeed, said at least one processor can control the completion of a tray, as there are a fixed number of samples and positions.

In one embodiment, the system comprises a first sample handling assembly and a second sample handling assembly, and at least one driving element, for driving the robotic arm to grab a sampling device from a first tray located in a first sampling station of the first sample handling assembly and, when all the sampling devices within the first tray have been used to collect a tissue sample, to alternatively grab a sampling device from a second tray located in a second sampling station of the second sample handling assembly.

Thus, uninterrupted automatic sampling operations may be implemented, allowing good sampling yields. The collection system is efficient and rapid.

In one embodiment, the system comprises a least one sound and/or lighting device, configured to emit audible and/or visual indications when a return magazine is full.

This type of device is an efficient way to notify the present operator that a full return magazine has to be changed for an empty one. It is also easy to implement on the collection system during construction of it.

In one embodiment, the camera of the system is linked to a visual recognition system, configured to distinguish suitable sampling areas from bones and fat on an animal. For example, a suitable sample area is lean, comprising lean muscle. As alternatives, other sample areas may be fat, bones, blood and connective tissues.

This allows the system to ensure reliability of the quality of the samples. Also, an operator can follow the sampling operations via a screen linked to the camera and make some verifications if necessary. This subsystem is easy to implement on the main automated collection system.

In one embodiment, the system comprises a display system for displaying data, said data comprising for example: the identifier of animals, the identifier of trays, and/or the location of the wells within said trays.

This allows the operator to do additional visual control during sampling operations.

In one embodiment, the system comprises a communication system for transmitting said data to a remote location. Communication with a remote element/device, for another possible control, is thus advantageously possible.

This remote location may be for example a computer located next to the collection system, a computer on the network, a remote server, the cloud, etc.

In one embodiment, the processor is remotely located in a control room in a dry area and receives said data via cables.

In such a way, sampling operations can be remotely controlled. Also, the processor is protected from humidity or possible waste coming from the animals in the slaughterhouse.

In one embodiment, the identifier associated with the animal and/or identifying the tray can be a visual identifier, an electronic identifier, or some combination. It could be for example a sequence of numbers, symbols, a barcode, an optical code, RFID, etc.

All these types of identifiers are easy to be implemented on the animals and/or the trays. Also, these types of identifiers may be easily recognized and recorded by detectors and/or readers.

In one embodiment, the system is contained in a box, for example of 2 meters by 3 meters.

The collection system is thus protected inside the abattoir, and it does not take a lot of space in the main factory system. For example, the collection system is enclosed in a stainless-steel frame. In one embodiment, at least the robotic arm, the camera, and the station(s) are located within the same stainless-steel enclosure.

In one embodiment, at least one sample handling assembly comprises a removable support configured to support and convey the tray from the support magazine to the station, and from the station to the return magazine along the supply line.

This removable support allows at least one sample handling assembly to reliably and easily convey trays from one location to another along the supply line. It is also easy to implement.

In one embodiment, the system comprises a running bar, configured to orientate said animal in a sampling position.

This running bar ensures that an animal to be sampled is held in place during sampling operations, to correctly sample a meat tissue.

In another embodiment, such running bar is not part of the system for collecting tissue samples, but is part of a general factory system comprising the collection system in accordance with at least one embodiment of the invention and a line carrying the animals/carcasses to be sampled.

In one embodiment, the system comprises a light source to illuminate a carcass with blue light. Thus, the color and/or shade of lean meat areas of a carcass can be easily and reliably differentiated from the color and/or shade of fat and bone areas. Such a light source may be for example a lamp or a light tube.

In another aspect, at least one embodiment of the invention provides a method for collecting tissue samples, implemented by at least one processor of a system as described above, comprising, for at least one first multi-well tray and at least one sampling device detachably mounted in a well of this first tray:

driving a first sample handling assembly to convey the first tray from a first supply magazine to a first sampling station, located at a position accessible by a robotic arm, driving this robotic arm to grab the sampling device from a well of the first tray, driving the robotic arm to scrape a scraping portion of the sampling device against the animal/to collect a tissue sample, obtaining and storing an identifier associated with the animal, an identifier of the first tray, and the location of the well within this first tray, driving the robotic arm to replace the sampling device with a collected sample within the same well of the first tray, and driving this first sample handling assembly to convey the first tray from the first sampling station to a first return magazine.

Said method for collecting tissue samples may also involve a general factory system as presented in relation with the collection system described hereinabove.

In one embodiment, the first tray is conveyed from the first sampling station to the first return magazine when all the sampling devices within the first tray have been used to collect a tissue sample.

In one embodiment, the method also comprises, for at least one second multi-well tray and at least one sampling device detachably mounted in a well of this second tray:

driving a second sample handling assembly to convey the second tray from a second supply magazine to a second sampling station, located at a position accessible by a robotic arm, spatially distinct from the first sampling location, and driving the robotic arm to grab sampling devices from the second tray when all the sampling devices within the first tray have been used to collect a tissue sample.

In one embodiment, the method also comprises:

detecting, by a camera linked to a visual recognition system, lean tissue areas suitable for sampling on the animal, by displaying these lean tissue areas in a specific color and/or shade, distinct from the color and/or the shade, or colors and/or shades, corresponding to fat and bones of said animal.

In one embodiment, the method comprises determining an identifier of the sampling device, from the identifier of the tray and the position of the sampling device within the tray, and assigning the identifier of the sampling device with the identifier associated with the corresponding animal.

For example, the identifier of the tray is extended by the two digits well reference corresponding to a grabbed sampling device by the robotic arm, to form a unique twelve digits sample reference number, which is linked to the identifier associated with the corresponding animal.

In another aspect, at least one embodiment of the invention provides a multi-well tray configured to receive a plurality of sampling devices, adapted to be used in a system for collecting tissue samples as presented hereabove.

In one embodiment, the tray comprises orientation markers, or more generally orientation means, ensuring a specific loading of said tray in a specific orientation for sampling operations.

For example, the tray comprises four corners with one, two or three cut corners. The tray may comprise a unique cut corner.

Said cut corner, for example a full height cut corner, can be used to load a tray in a magazine in said collection system in a specific orientation.

Thus, the trays all along the magazine are stabilized. There is only one viable position to put the trays in a magazine. The coordinates of the wells of the trays during sampling operations are fixed and reliable. This is especially advantageous for the tray located on the sampling station.

In one embodiment, the tray comprises temporary retention means, for example, pin(s), blockers, retainers or a specific shape of the well to temporarily retain a sampling device within a well, configured to retain at least one sampling device in a well of the tray as long as a force above a predetermined threshold is not applied to the sampling device.

These temporary retention means stabilizes and secures all the sampling devices in a tray. So, if a tray falls over or when an operator handles the tray, all the sampling devices keep their position in the wells of the tray.

In one embodiment, at least one well of a tray comprises an identifier.

For example, a static injection mould cavity number can be used as an identifier to identify the well. This well's identifier may also be an optical code, RFID, or a barcode or any usual ID means.

According to this configuration, a more secure traceability of the samples is insured. It is also an easy way to identify the wells of a tray during the manufacture of it.

In one embodiment, the tray has a length between 125 and 130 mm, a width between 83 and 87 mm, and the depth of the wells is between 29 and 32 mm. More generally, the collection system can work with any tray/multiwell plate standardized for example by the "Society for Biomolecular Sciences" (SBS).

In another aspect, at least one embodiment of the invention provides a non-transitory computer-readable medium comprising program instructions stored therein to execute at least one step of the method described above.

Other aspects and embodiments of the invention are defined and described in the other claims set out below.

LIST OF FIGURES

Other features and advantages of one or more embodiments of the invention shall appear more clearly from the following description of a particular embodiment, given by way of a simple illustrator and non-exhaustive example and from the appended drawings, of which:

FIG. 1 illustrates an automated system for collecting tissue samples in accordance with an embodiment of the invention, which may be part of a more general factory system;

FIG. 2 presents an example of a supply magazine and a return magazine according to FIG. 1;

FIGS. 3A-3C illustrate an example of a tray contained in a supply magazine according to FIG. 2, wherein:

FIG. 3A illustrates a top view of such a tray comprising sampling devices,

FIG. 3B illustrates a side view of such a tray comprising sampling devices, and

FIG. 3C illustrates another side view of such a tray comprising sampling devices, taken along line II' of FIG. 3B.

DESCRIPTION OF ONE EMBODIMENT OF THE INVENTION

Figure 1:
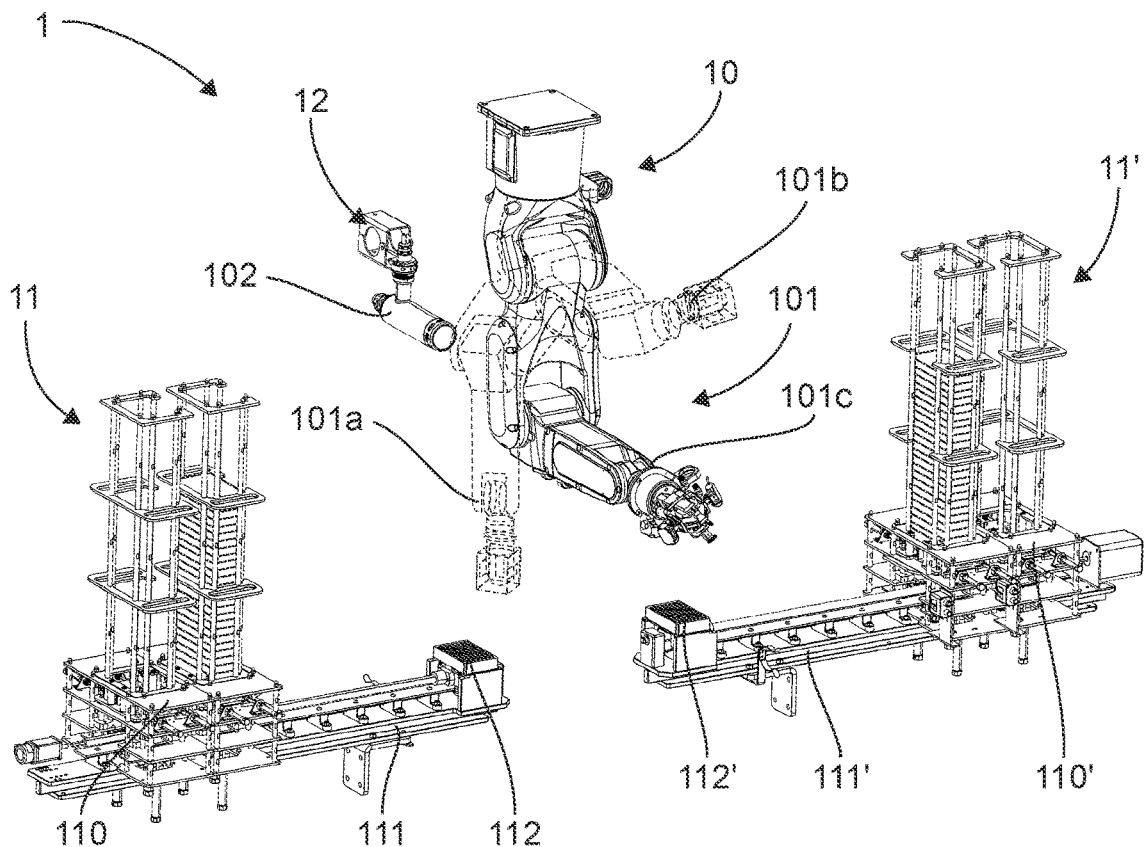

Aspects of the invention disclosed herein relate to the automation, including complete automation, of a system for collecting animal tissue samples, including a succession of tissue samples. For example, collection system and method in accordance with an embodiment of the invention allow the automated loading of a multiwell tray containing sampling devices in a fixed location suitable for the robotic arm of the system to take a sampling device. A collection system and method in accordance with an embodiment allow the automated unloading of said tray full of collected samples from said fixed location. A collection system and method in accordance with an embodiment of the invention may be configured to automatically index a scrapped tissue sample by linking an identifier associated with the animal with the identifier of the tray and with the location of the well containing the sampling device used for the sampling of said tissue on said tray. In some embodiments, the collection system and method are fully automated. In other embodiments, only parts of the collection system and method are automated.

In embodiments, the invention includes an automated robotic system, equipped with a robotic arm. The end of this robotic arm is configured to engage a tissue sampling device seated in a well of a multiwell tray. Said tray is automatically conveyed along a supply line of the collection system. For example, a tray may be de-nested from a supply magazine located on a magazine mounting assembly, and moved to a fixed location where it is held in place during the robotic arm interaction. After this robotic arm has scrapped a sampling device against the animal and collected a tissue sample, it replaces said sampling device in the same well of the tray. The collection system is also able to receive an identifier of the animal from the same reader that reads the identifier of the tray, or by a second reader, and link the identifier of the scrapped animal with the identifier of the tray and with the coordinates of the well on the tray containing the sampling device used to collect the sample. The coordinates of the well can be relative to the location of said well inside the tray (for example, the well located at the intersection of the third line and the fourth column of the tray). The collection system is then able to automatically unload this tray from the fixed location and convey it to a return magazine on the magazine mounting assembly, for example once the multiwell tray is entirely completed with scrapped meat samples. Such robotic system, comprised in the collection system, may be included in a more general factory system of a slaughterhouse or plant, comprising a line carrying the carcasses. A camera and a presence sensor can be involved in the detection of an animal in a predetermined sampling range in the system, such presence sensor being part of the factory system and/or part of the collection system.

We present below an embodiment of the invention, implemented to collect tissue samples from a carcass of an animal, for example at slaughterhouses. It should be noted that the collection system according to an embodiment of the invention can also be implemented on live animals, that could be directed to the sampling robot by dedicated gates.

Referring now to FIG. 1, an automated system 1 for collecting tissue samples of animal carcasses, for example a succession of tissues samples, according to an embodiment of the invention is presented. This automated collection system can be part of a general factory system.

Such a collection system 1 comprises at least one sample handling assembly.

In the embodiment illustrated in FIG. 1, the collection system 1 comprises two distinct sample handling assemblies 11, 11'. However, such a collection system can comprise only one sample handling assembly (not illustrated), or more than two sample handling assemblies (not illustrated). For example, the implementation of more than one sample handling assembly in the collection system allows uninterrupted automatic sampling operations, consequently leading to good sampling yields. During operation, when one tray located in a first sampling station is full of collected samples and is returning back to a first sample handling assembly, in the return magazine, the robotic arm of the collection system does not need to wait for a second tray of this first sample handling assembly to be placed of this first sampling station. It can focus on a tray located in a second sampling station and coming from a second sample handling assembly. Each of these sample handling assemblies 11, 11' comprises a supply line 111, 111', on which is mounted a magazine mounting assembly 110, 110'. Such a magazine mounting assembly 110, 110' is configured to support a supply magazine and a return magazine. A magazine mounting assembly can comprise one or more horizontal handles, to facilitate its transport. The supply line 111, 111' comprises, for example at one of its extremities, a sampling station 112, 112', configured to support a tray, coming from the supply magazine. Each of the sample handling assemblies 11, 11' of the collection system can also comprise a mobile support, such as a trolley, located along the supply line 111, 111', to support a tray when it is conveyed from the supply magazine to the station 112, 112', for the robotic arm 101 to pick up sampling devices.

The collection system 1 is thus also equipped with a robotic system 10 comprising a robotic arm 101, configured to take a sampling device located on a tray, when the tray is located on one of the sampling stations 112, 112'. Said robotic arm 101 can present various degrees of freedom, for example six degrees of freedom. Said robotic arm 101 can be in various positions, for example in a pick-up position 101a, in a swiping position 101b, or again in an idle position 101c. The arm in the pick-up position 101a can hold a sampling device at its proximal handling portion and extract it out of the multiwell tray. Indeed, the end of the robotic arm can be structurally configured to fit with the proximal handling portion of sampling device. The arm in the swiping position 101b can suitably move to direct itself towards the location detected by the processor for any operation. The arm in the idle position 101c is in a position suitable to wait for an operation. Said robotic system 10 is also equipped with a camera 102, allowing the visualization of an approaching carcass. Said camera can be linked to a visual recognition system, thus allowing the visualization of the suitable sampling area on the carcass, once it is correctly positioned for sampling.

The robotic arm 101 of this collection system 1 can be equipped with a pressure sensor. This allows the system to measure the force applied by the robotic arm 101 when it has scrapped the scrapping end of a sampling device against a carcass. Thus, the robotic arm 101 is able to apply the necessary force against said carcass to realize a suitable sampling, for example to scrap enough meat tissue. This applied pressure may be previously configured, and fixed during sampling operations. But said pressure may also be dynamically adjusted in real time by a visual recognition system and machine learning algorithms, to achieve reliable consistent samples.

The collection system 1 can detect that an animal/a carcass is present upon reception of information coming from a presence sensor. This presence sensor enables the detection of an animal within a specific area or range, such as within a predetermined distance of the system, and then sends the corresponding information to the collection system 1. According to one example, said specific area corresponds to an area where the carcass is in front of the robotic arm, or to a certain area determined by the camera system. This presence sensor can take the form of a laser range finder, configured to check that a carcass is present in said area or range. It is also able to determine that a carcass is entering said area or range. This presence sensor can also take the form of a limit switch, configured in the same way as the laser range finder. This presence sensor may also be for example a camera (which can be the same as the camera used to detect a sampling location on the animal or another camera), a motion sensor, a trigger, etc.

The collection system 1 can also comprise at least one detector, allowing it to determine that all the sampling devices of a tray located in one station 112, 112', and having been considered by the robotic arm 101, have indeed been used to collect tissue samples from carcasses. For example, the collection system knows the number of sampling devices per tray (parameter input by an operator, or previously stored in a memory of the system, or read from the tray, etc.). The detector, via for example the processor of the collection system, can thus count the number of sampling devices grabbed by the robotic arm, and when the number is equal to the number of sampling devices per tray, decide that all the sampling devices of a tray have been used to collect tissue samples.

The collection system 1 can also be equipped with at least one device configured to emit a sound and/or a light. This device is useful to alert an operator, or other person present near the collection system, that a supply magazine has been emptied of its fresh trays, and that the corresponding return magazine is full of said trays, which have been used to collect samples. Thus, this sound and/or lighting device may alert an operator that these magazines have to be changed for new ones.

The collection system 1 also includes a processor. It is operably coupled to the robotic system 10, to the at least one handling assembly (for example two sample handling assemblies 11, 11' as illustrated in FIG. 1), and to a reader 12. In the example of FIG. 1, said reader is configured to obtain the identifier of the tray located on the station 112, 112' and accessible by the robotic arm 101 to scrap said carcass with a sampling device of said tray. This processor can be remotely located in another area, like a control dry room, to be protected for example from moisture, blood or liquids which can flow from the carcasses. Information captured by the collection system 1 can be sent to the processor via various means, for example via cables or Internet. Such captured information are for example the detected identifiers of the carcasses, of the multiwell trays, and the location of the wells on said trays from which sampling devices have been removed. The processor is also configured to link at least these three pieces of information, for a reliable traceability of the carcasses and the collected samples.

Also, this automated robotic system 10, with the robotic arm 101 and the camera 102, can be itself protected, for example by being placed in a box/an enclosure. In such a configuration, this enclosure has an opening on the front side facing the line(s) conveying carcasses for the robotic arm 101 to take the sample and for the camera 102 linked to the visual recognition system to identify the suitable sample location on the carcasses.

This collection system 1 can comprise a display system, which displays data comprising the identifiers of carcasses and trays corresponding to said carcasses, and the location of the wells comprising the sampling devices used to scrap said carcasses. Other data may be displayed on this display system, like for example data relating to the animal when he was living, data relating to the destination of the meat of the carcasses after sampling or data relating to the filling level of the tray with collected samples. The collection system can also be equipped with a communication system, notably configured to transmit said displayed data to a remote location, via for example the internet.

This collection system 1 may also comprises a fixed and static running bar, configured to ensure that the carcasses which pass in front of it during sampling operations are correctly orientated and not swinging. Thus, said running bar may be located in the predetermined sampling area.

In another embodiment, such running bar is not part of the collection system, but part of the overall factory system.

The size of the collection system 1 presented in FIG. 1 can be limited to avoid taking up space on the abattoir line. For example, it thus does not take up more than 2 m of line, and has a maximum footprint of 2 m×3 m.

Figure 2:
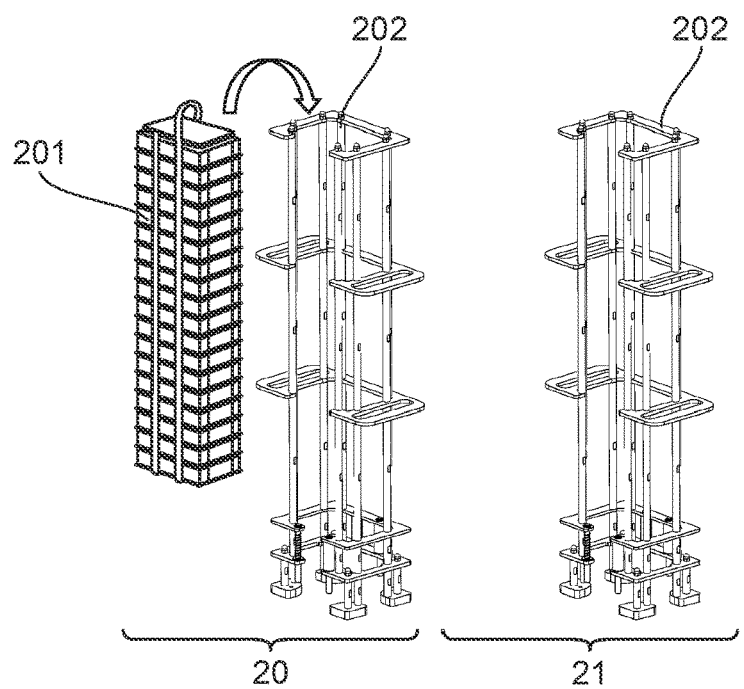

Referring to FIG. 2, an example of a supply magazine 20 and a return magazine 21 adapted to be mounted on a magazine mounting assembly 110 according to FIG. 1 is presented.

Such a supply magazine 20 comprises a framework 202 which can be made of metal, plastic or other similar materials. In this example, said framework 202 is made of ridged stainless-steel bars. This framework 202 is made in such a way that a stack of multiwell trays 201 can be placed and contained within. For example, the stacks of multiwell trays 201 arrive in the collection system in supply boxes, where each box contains 6 stacks of trays 201, and each stack of trays 201 contains 16 multiwell trays. In the boxes, the trays of a stack of trays 201 are strapped together with a handle, for manual handling. This configuration allows an operator to easily place a stack of multiwell trays 201 from the supply box to a supply magazine 20.

A return magazine 21 presents the same framework's structure 202 as the supply magazine 20, except that said return magazine 21 is not filled with a stack of trays.

Figure 3A:
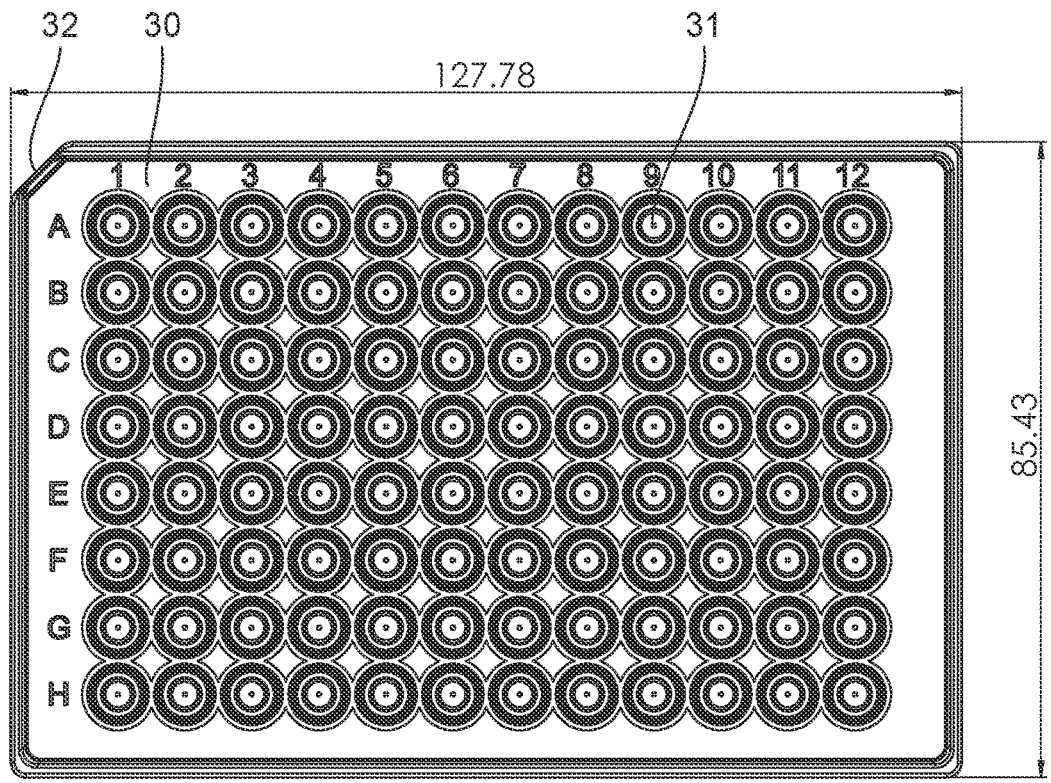
Figure 3B:
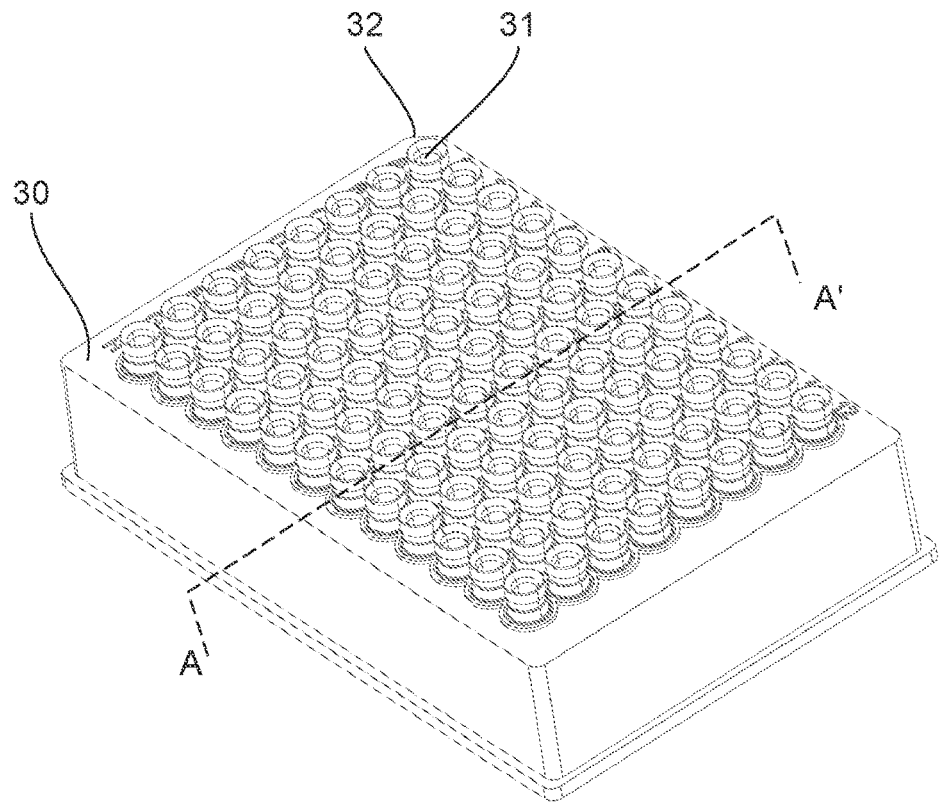
Figure 3C:
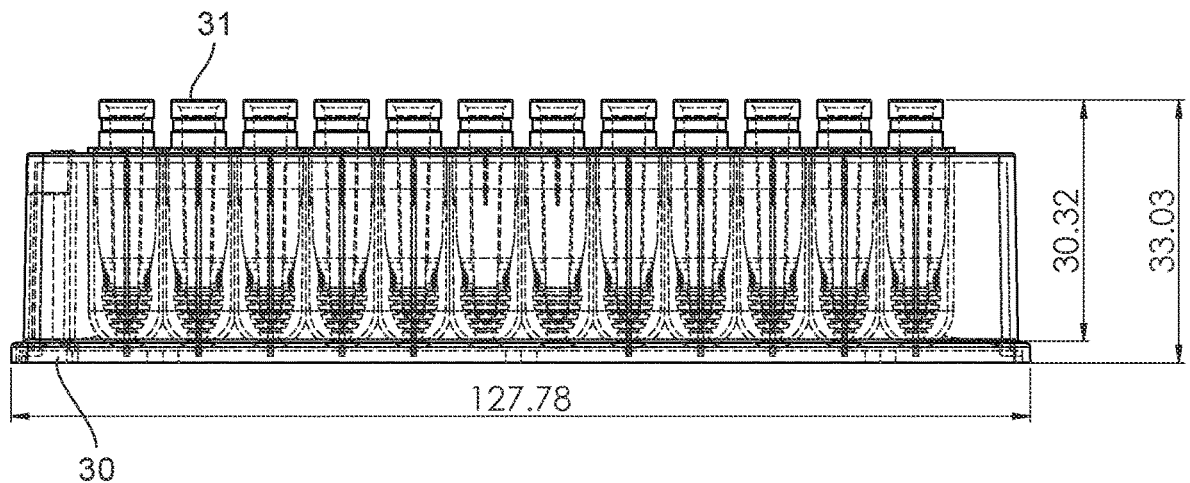

Referring to FIGS. 3A-3C, an example of a tray 30 contained in a supply magazine 20 according to FIG. 2, via a stack of trays 201, is presented.

In the example illustrated in FIGS. 3A, 3B and 3C, the tray 30 presents a rectangular structure. This structure presents a length between 125 and 130 mm, a width between 83 and 87 mm, and a depth of the wells is between 29 and 32 mm. It can comprise 96 wells, each configured to contain sampling devices 31. These wells are manufactured in such a way that, when a sampling device 31 is correctly placed in a well, it cannot be removed, unless a force above a predetermined threshold is applied to said sampling device 31. For instance, external "fins" can be provided on the sampling devices to provide friction fit of the sampling device in the well, while the sampling device is inserted into the well. Thus, for example, when a tray 30 or a stack of trays 201 falls down and overturns, the sampling devices 31 placed in the wells of a tray 30 remain in place inside said wells. This is allowed by temporary retention means linked to said wells.

However, this multiwell tray may also be implemented separately from the collection system previously described. It may be implemented alone, in another collection system, or in any other kind of systems.

Also, a tray 30 comprises four corners, and one of them has a cut corner 32, for example a full height cut corner 32. This configuration allows for example the loading of said tray 30 in the metallic framework 202 of a supply magazine 20 according to a unique specific orientation. Thus, the filling of the supply magazines 20 is simplified, and the robotic system 10 can easily and correctly identify the recorded coordinates of the wells of a tray 30 when such a tray 30 is placed on the sampling station 112, 112'.

However, the loading of the trays according to a unique specific orientation may be implemented thanks to other features, for example by the way of specific colors, shapes or sizes for these trays.

All the trays 30 implemented in the supply magazines 20 of this collection system 1 comprise an identifier. Each well of said trays 30 can also comprise an identifier, for example a static injection mould cavity number, in order to identify each well of a tray 30. This allows for a more reliable traceability of the collected samples.

Figure 4:
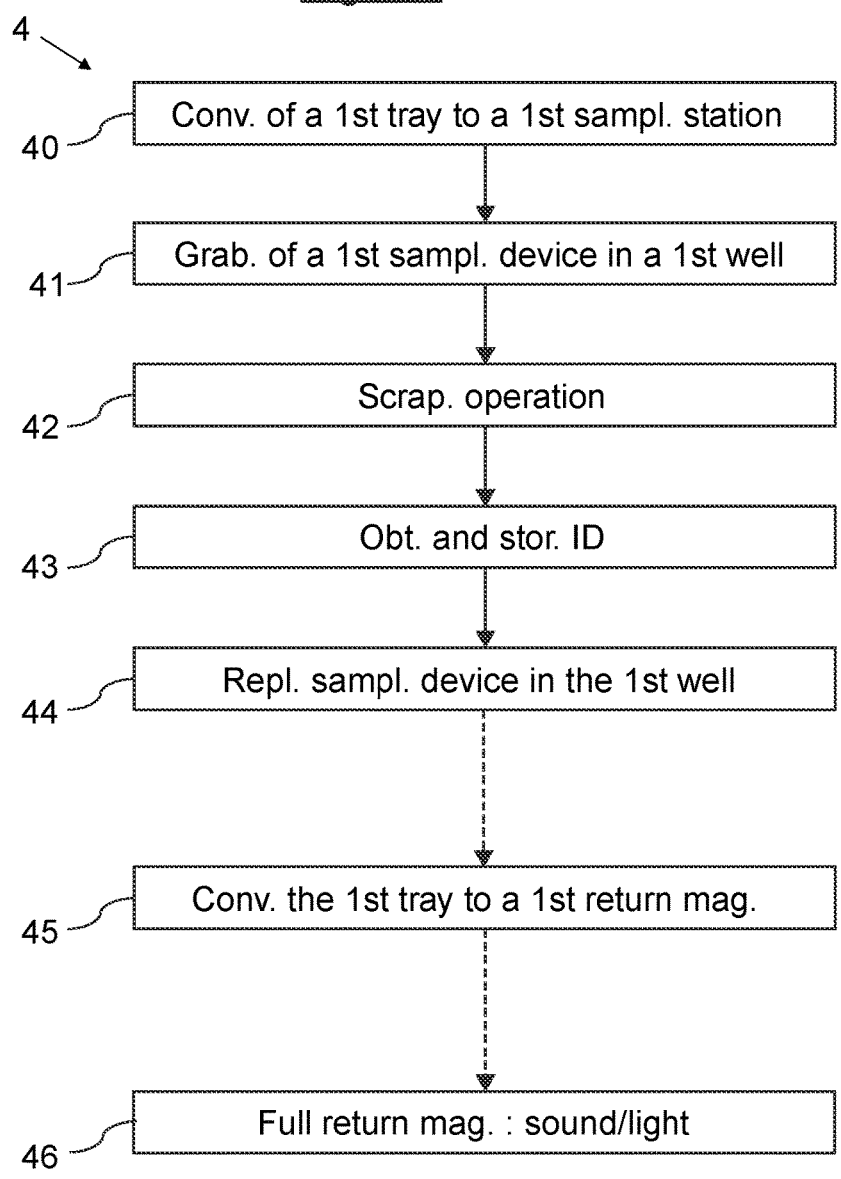
FIG. 4 presents a flowchart of a method for collecting tissue samples in accordance with an embodiment of the invention.

Referring to FIG. 4, a flowchart of a method 4 for collecting tissue samples according to an embodiment of the invention is presented. This method can be implemented by the collection system 1 presented in FIG. 1.

According to a preliminary configuration, before the robotic system 10 of FIG. 1 can be automatically operated, at least one magazine mounting assembly has to be loaded with a supply magazine and a return magazine.

If we consider the embodiment illustrated in FIG. 1 where the collection system 1 comprises two distinct sample handling assemblies 11, 11', two magazine mounting assemblies 110, 110' can be loaded each with a supply magazine 20 and a return magazine 21, at the extremities of the two supply lines 111, 111' of said collection system 1. For that, the stacks of trays 201 are firstly brought in supply boxes in a packaging room in the abattoir. The trays of each stack of trays 201 in the boxes are strapped together with a handle, allowing a stack of trays 201 to be manually placed inside the framework 202 of a fresh supply magazine 20 by an operator. This filling operation can be realized in a specific working area of said packaging room.

Once at least one supply magazine has been filled with a stack of multiwell trays, the straps surrounding the trays are discarded and the handles are removed.

If we consider the embodiment illustrated in FIG. 1 where the collection system 1 comprises two distinct sample handling assemblies 11, 11', then for example two fresh supply magazines 20 could be filled each with a stack of multiwell trays 201. In other embodiments, not illustrated, the number of fresh supply magazines can be one or more than two. As already detailed, the use of two sample handling assemblies, each filled with one supply magazine filled with a stack of multiwell trays 201, enable the robotic arm to switch from one sample handling assembly to the other one, to enable uninterrupted automatic sampling operations.

These two supply magazines 20 are then each loaded at an extremity of the supply lines 111, 111' of the collection system 1. Two empties return magazines 21, which do not contain any stack of trays, are also loaded at said extremities of said supply lines 111, 111', for example each behind a supply magazine 20. Thus, once the collection system is equipped with the supply and return magazines mounted on the two magazine mounting assemblies 110, 110', at the extremities of two supply lines 111, 111', as represented on FIG. 1, it is configured and ready for sampling operations.

According to a first step 40, the robotic system 10, by the way of a processor, drives the first sample handling assembly 11 to convey a first tray from the supply magazine 20 of the first magazine mounting assembly 110 to the first sampling station 112, at the opposite extremity of the first supply line 111, so that said tray is accessible by the robotic arm 101.

Then, in a step 41, the robotic system 10 drives the robotic arm 101 to grab a sampling device from the first well of said accessible tray, this first well being identified and recorded by the system via its coordinates on the tray.

For example, said step 41 automatically starts when the robotic system 10 detects, via information received by the presence sensor of the general factory system, that a carcass is located in the specific area or range. This detection, by the way of information sent to the robotic system 10, can activate the robotic arm 101 for a sampling operation. At this stage, the camera 102 of the robotic system 10, linked to the visual recognition system, also detects the carcass present in the sampling area/range. The carcass is also displayed on the display system, so that the operator monitoring and controlling the sampling operations can see the carcass and the sampling process on the screen of this display system.

For example, the line of the factory system that carries the carcasses is moving continuously. But it may also be possible that this line stops for a short period of time, for example for several seconds or milliseconds, corresponding to the time taken by a sampling device to scrap a suitable amount of lean tissue on a carcass.

In the next step 42, for example according to a programmed path executed by the processor(s) of the robotic system 10, said system drives the robotic arm 101 to scrape the scraping portion of said sampling device against the carcass placed in the sampling area, to collect a tissue sample. In this step 42, the robotic system 10 determines the suitable sampling area on the target carcass via the camera 102 and the visual recognition system, when the carcass is moving across the front of the robotic system 10. For example, lean tissues of the carcass can appear in a first color and/or shade, and fat and bones can appear in a second color and/or shade. According to a particular example, fatty parts of the carcass appear in a whitish shade, whereas lean meat appears in a reddish shade. Bones also appear in a shade close to the whitish shade of the fatty parts, even though they have meat attached. In any case, the color/shade differences between fat and meat are very clear. Moreover, the carcass located in the sampling range of the collection system can be illuminated with blue light, so that the reddish lean meat areas appear darker than the whitish fat areas. In this way, the white side is saturated. This color/shade disparity can thus be used to clearly and easily identify the potential lean meat sample areas, for example via a specific algorithm, and/or via the processor of the collection system. Said potential sample areas can thus be evaluated for position and size, allowing the selection of a specific optimal area that is suitable for the robotic arm 101 to come into contact. The coordinates of this selected optimal area are thus locked and sent to the robotic system 10.

The collection system is also able to detect that a carcass does not present areas with lean meat. In such a case, the robotic arm 101 does not sample said carcass, and the data relative to said non-sampled carcass and to the corresponding well of the multiwell tray indicates that no viable sample is present in said well.

Also, according to a specific embodiment, the factory system may be equipped with a reader (for example a RFID reader, a camera-based reader, etc.) configured to read the identifier (for example a sequence of numbers, symbols, a barcode, an optical code, RFID, etc.) of each hook, or other equipment, carrying the carcasses that enter in this factory system. A list is thus populated containing all upcoming carcasses in the system. Once a carcass enters the collection system, for example enters in the sampling range of the camera of this collection system, the collection system acts to detect a lean meat area. If such a lean meat area is detected, the robotic arm of the collection system collects a meat sample in said carcass, and said sample is electronically associated to the identifier of the carcass. However, if the collection system does not detect such a lean meat area, the robotic arm does not sample the carcass and a piece of information such as "no viable sample present" for example can be, in this case, electronically associated to the identifier of the carcass.

The camera 102 can thus detect the suitable lean tissues sampling area and sends the coordinates of said suitable area to the robotic system 10. However, the visualization of the different tissues of the carcass may appear in more than two shades.

One example of a suitable sampling area is located at the top side of the carcass, at the Aitch bone break. This specific area is mainly relevant regarding the dimensions of the robotic system 10, and especially regarding the line carrying the carcasses. Indeed, it was determined that the top side area of a carcass is a particularly suitable area from a mechanical perspective. The carcass motion decreases as the robotic arm approaches from the hook which carries said carcass, and this specific area is always an area of lean meat, relevant for further laboratory analysis.

The pressure sensor of the robotic arm 101, that can be driven by the processor(s) of the collection system, allows the system to measure the force applied against the carcass, which ensures that sufficient contact has been made to collect the tissue sample. In this way, the pressure sensor can incorporate a pneumatic cylinder in an arrangement set to provide a consistent pressure by the robotic arm 101 against the carcass to be scrapped. For example, the sample should not contain between more than 5% to 15% by weight of fat, and preferably not more than 10% by weight of fat. Also, an example of a suitable weight range for such a sample is between 0,001 mg and 1000 mg, preferably between 0.1 mg and 500 mg, more preferably between and 1 mg and 100 mg, and more preferably between 5 mg and 20 mg. Generally, a suitable sample weight range corresponds to a weight adapted for downstream analysis/processing on said sample.

According to a next step 43, before, during or after the sampling of the meat tissue from the carcass, the collection system obtains and stores the identifier associated with said carcass, and also the identifier of the tray containing the used sampling device and the location of the well from which is taken said used sampling device. The identifier of the carcass may be read and sent to the robotic system by the factory system or it may be read by the collection system directly.

For example, each carcass entering in the factory system may be provided with an identifier, relating to its live animal information, for example blood group or diseases during lifetime. Said identifier may be any of the identifiers described here, including a visual identifier, an electronic identifier, or some combination, like for example a sequence of numbers, symbols, RFID, a barcode or an optical code. The factory system comprises at least one reader 12, which detects this carcass identifier, no matter what form takes this identifier, when said carcass passes in front of it. Thus, the reader may be a RFID reader, a camera-based reader, or any kind of reader capable of reading all the forms that the identifier can take.

The collection system 1 also comprises a reader 12 for obtaining the ID of the tray.

The collection system then assigns the carcass identifier to the identifier of the tray located on the station 112 for sampling and also to the position/the coordinates on the tray of the sampling device used to collect the sample associated with said carcass. For example, the trays implemented in the collection system 1 have each a 10 digits code, which is read before any sampling operation, for example by a barcode scanner. When the collection system links the code of a tray to the well's coordinates of the sampling device used against a carcass, the 10 digits tray number is extended by the 2 digits well reference of the well used for sampling, from 01 to 96, to form a unique 12 digits sample reference number. This number is then linked to the carcass identifier. These three pieces of data can be linked, for example, as a time stamped entry in a stored file, on a local computer, on a server, or in the cloud. Other data may also be possibly linked with these three pieces of data, like for example data relating to the animal when it was living, data relating to the destination of the meat of the carcasses after sampling, a potential hook identifier, or again location information relating to the slaughterhouse.

Each carcass entering the collection system 1 can also, in addition or as another possibility, have an identifier regarding the hook carrying said carcass throughout the collection system 1. The hook identifier may be an electronic identifier (such as RFID), a visual identifier, or some combination. For example, this identifier can be a unique pattern drilled out of the shank of the hook, which can especially be a light pattern. This hook identifier can be read when the carcass passes in front of the reader 12 of the robotic system 10, and the reader 12 recognizes at the same time the carcass identifier.

The identifiers identifying the animals, trays, and hooks can thus take the form, for example, of number sequences, barcodes or optical codes.

All these information and identifiers are stored in database. These data can be displayed on paper using a printer or a recorded, or on another medium such as a disk. The data may also be electronically transferred via a communication system to a laboratory where the samples are to be analyzed.

Then, in a step 44, the robotic system 10 drives the robotic arm 101 to replace the used sampling device containing the collected sample within the same well.

Indeed, during a sampling operation, the considered tray is locked in a fixed location on the supply line 111 (the station 112). Thus, each well of said tray is also in a fixed location. The robotic system 10 is thus able to determine and record the coordinates of each well of the tray on the station 112. It consequently guides the robotic arm 101 to pick a chosen sampling device and to return it to the same location.

The steps 40 to 44 are repeated for all the sampling devices of the tray located at this first station 112.

In a following step 45, the collection system 1 drives the first sample handling assembly 11 to convey this first tray from this first sampling station 112 to the return magazine 21, located behind the supply magazine 20 which initially comprised said tray. This step 45 can be implemented by the collection system once all the sampling devices of the first tray located on the station 112 have been used to collect tissue samples. This step can thus be operated according to the detector of the collection system, configured for such a determination that a tray is full of collected samples.

This step 45 is repeated for all the trays located in the supply magazine 20 of said first magazine mounting assembly 110.

In a step 46, once the return magazine 21 contains all the trays initially located in the supply magazine 20, said trays within the return magazine 21 comprising collected samples, the sound and/or lighting device of the collection system 1 is activated. An operator is thus alerted that the supply and return magazines 20, 21 of this first magazine mounting assembly 110 need to be replaced. However, other ways to send an alert may be implemented on the collection system, like for example a text message, an email, or an alert on the display of the system. Thus, the collection system may alert operators who are near it, but also people located further away. So, these magazines 20, 21 are renewed: a new supply magazine 20 comprising a new stack of fresh multiwell trays 201 full with new sampling devices is placed at the extremity of this first supply line 111; and a new return magazine 21, empty, is placed behind said new supply magazine 20.

During this renewal of these magazines 20, 21, all the steps 40 to 45 of the method 4 for collecting tissue samples previously described can be implemented for the second sample handling assembly 11'. The presence of these two supply lines 111, 111' in the collection system 1 thus allows uninterrupted sampling operations.

When an entire pair of supply and return magazines 20, 21 has been used for sampling operations, it is removed from the supply line 111, so that a new pair of magazines 20, 21 can be loaded in this supply line 111. In the packaging room, and specifically in the working area, the stack of trays 201 of the return magazine 21 is removed from the metallic framework 202. It is strapped again using a strapping machine, and handles initially linked to these trays arriving in the packaging room are replaced. The stack of full trays 201 is then replaced in the supply box, which box is sent to a laboratory for further procedures, for example DNA analysis of said tissue samples, storage, freezing of said samples, etc.

The collection system 1 according to an embodiment of the present invention implements sampling operations at a speed of between 300 to 420 samples per hour.

The collection system 1 may be cleaned in the abattoir according to an existing abattoir cleaning regime which includes for example high pressure hoses, acidic and caustic washes.

The invention claimed is:

1. A system configured for collecting tissue samples, comprising:
   a robotic system, comprising:
      a robotic arm, and
      at least one camera, configured to detect a sampling location on an animal,
   at least one sample handling assembly, comprising:
      at least one magazine mounting assembly, configured to support at least one supply magazine and at least one return magazine,
      said at least one supply magazine being configured to receive at least one multi-well tray comprising a plurality of sampling devices detachably mounted in the wells of said at least one multi-well tray, and
      said at least one return magazine being configured to receive said at least one multi-well tray, comprising said plurality of sampling devices with collected tissue samples,
      at least one supply line, configured to convey the at least one multi-well tray from said at least one supply magazine to at least one sampling station, and from said at least one sampling station to said at least one return magazine, and
      said at least one sampling station, located at a position accessible by said robotic arm,
   at least one reader configured to obtain an identifier of one of said at least one multi-well tray, and
   at least one processor, operably coupled to said robotic system, to said at least one sample handling assembly, and to said at least one reader, configured to:
      drive said at least one sample handling assembly to convey said at least one multi-well tray from said at least one supply magazine to said at least one sampling station,
      drive said robotic arm to grab a sampling device from a well of said at least one multi-well tray,
      drive said robotic arm to scrape a scraping portion of said sampling device against the animal,
      obtain and store an identifier associated with said animal, the identifier of said at least one multi-well tray, and the location of the well within said at least one multi-well tray,
      drive said robotic arm to replace said sampling device with said collected sample within the same well of said at least one multi-well tray, and
      drive said at least one sample handling assembly to convey said at least one multi-well tray from said at least one sampling station to said at least one return magazine.

2. The system according to claim 1, wherein said robotic arm comprises a pressure sensor, configured to measure the force applied to said animal by said robotic arm during sampling.

3. The system according to claim 1, wherein said system is configured to receive information from at least one presence sensor.

4. The system according to claim 1, wherein the processor is configured to detect when all the sampling devices within said multi-well tray have been used to collect a tissue sample by counting the number of samples taken.

5. The system according to claim 1, wherein the system comprises a first sample handling assembly and a second sample handling assembly, and at least one driving element for driving said robotic arm to grab a sampling device from a first tray located in a first sampling station of the first sample handling assembly and, when all the sampling devices have been used to collect a tissue sample, to alternatively grab a sampling device from a second tray located in a second sampling station of the second sample handling assembly.

6. The system according to claim 1, wherein the system comprises a least one sound and/or lighting device, configured to emitting audible and/or visual indications when a return magazine is full.

7. The system according to claim 1, wherein said camera is linked to a visual recognition system, configured to distinguish lean areas from bones and fat on an animal carcass.

8. The system according to claim 1, wherein the system comprises a light source to illuminate a carcass with blue light.

9. A method for collecting tissue samples, implemented by at least one processor of a system; comprising at least one first multi-well tray and at least one sampling device detachably mounted in a well of said at least one first multi-well tray, said method comprising:
   driving a first sample handling assembly to convey said at least one first multi-well tray from a first supply magazine to a first sampling station, located at a position accessible by a robotic arm,
   driving said robotic arm to grab the at least one sampling device from the well of said at least one first multi-well tray,
   driving said robotic arm to scrape a scraping portion of said at least one sampling device against an animal to collect a tissue sample, obtaining and storing an identifier associated with said animal, an identifier of said at least one first multi-well tray, and the location of the well within said at least one first multi-well tray, driving said robotic arm to replace said at least one sampling device with said collected tissue sample within the same well of said at least one first multi-well tray, and driving said first sample handling assembly to convey said at least one first multi-well tray from said first sampling station to a first return magazine.

10. The method according to claim 9, wherein the method also comprises, for at least one second multi-well tray and at least one sampling device detachably mounted in a well of said at least one second multi-well tray:

driving a second sample handling assembly to convey said at least one second multi-well tray from a second supply magazine to a second sampling station, located at a position accessible by said robotic arm, spatially distinct from said first sampling station, and driving said robotic arm to grab sampling devices from said at least one second multi-well tray when all the sampling devices within said at least one first multi-well tray have been used to collect said tissue sample.

11. The method according to claim 9, wherein the method also comprises:

detecting, by a camera linked to a visual recognition system, lean tissue areas suitable for sampling on the animal, by displaying said lean tissue areas in a specific color, distinct from the color corresponding to fat and bones of said animal.

12. The method according to claim 9, wherein the method comprises determining an identifier of the at least one sampling device, from the identifier of said at least one first multi-well tray and the position of said at least one sampling device within the at least one first multi-well tray, and assigning the identifier of the at least one sampling device with the identifier associated with each corresponding animal.

13. A non-transitory computer-readable medium comprising program instructions stored therein for collecting tissue samples, when the instructions are executed by at least one processor of a system for collecting tissue samples, wherein, for at least one first multi-well tray and at least one sampling device detachably mounted in a well of said at least one first multi-well tray, the instructions configure the system to:

drive a first sample handling assembly to convey said at least one first multi-well tray from a first supply magazine to a first sampling station, located at a position accessible by a robotic arm, drive said robotic arm to grab the at least one sampling device from said well of said at least one first multi-well tray, drive said robotic arm to scrape a scraping portion of said at least one sampling device against an animal to collect a tissue sample, obtain and store an identifier associated with said animal, an identifier of said at least one first multi-well tray, and the location of the well within said at least one first multi-well tray, drive said robotic arm to replace said at least one sampling device with a collected sample within the same well of said at least one first multi-well tray, drive said first sample handling assembly to convey said at least one first multi-well tray from said first sampling station to a first return magazine.

* * * * *

UNITED STATES PATENT AND TRADEMARK OFFICE
CERTIFICATE OF CORRECTION

| | |
|---|---|
| PATENT NO. | : 12,174,208 B2 |
| APPLICATION NO. | : 17/374265 |
| DATED | : December 24, 2024 |
| INVENTOR(S) | : David Robert Thomas et al. |

It is certified that error appears in the above-identified patent and that said Letters Patent is hereby corrected as shown below:

In the Claims

Claim 5 reads:
5. The system according to claim 1, wherein the system comprises a first sample handling assembly and a second sample handling assembly, and at least one driving element for driving said robotic arm to grab a sampling device from a first tray located in a first sampling station of the first sample handling assembly and, when all the sampling devices have been used to collect a tissue sample, to alternatively grab a sampling device from a second tray located in a second sampling station of the second sample handling assembly.

This should be corrected to read:
5. The system according to claim 1, wherein the system comprises a first sample handling assembly and a second sample handling assembly, and at least one driving element for driving said robotic arm to grab a sampling device from a first tray located in a first sampling station of the first sample handling assembly and, when all the sampling devices within said first tray have been used to collect a tissue sample, to alternatively grab a sampling device from a second tray located in a second sampling station of the second sample handling assembly.

Signed and Sealed this
Fourteenth Day of October, 2025

John A. Squires
*Director of the United States Patent and Trademark Office*